United States Patent
Hanaoka

(10) Patent No.: US 9,577,691 B2
(45) Date of Patent: Feb. 21, 2017

(54) FRONT END CIRCUIT

(71) Applicant: Murata Manufacturing Co., Ltd., Nagaokakyo-shi, Kyoto-fu (JP)

(72) Inventor: Kunitoshi Hanaoka, Nagaokakyo (JP)

(73) Assignee: Murata Manufacturing Co., Ltd, Kyoto (JP)

( * ) Notice: Subject to any disclaimer, the term of this patent is extended or adjusted under 35 U.S.C. 154(b) by 0 days.

(21) Appl. No.: 15/173,815

(22) Filed: Jun. 6, 2016

(65) Prior Publication Data

US 2016/0285490 A1 Sep. 29, 2016

Related U.S. Application Data

(63) Continuation of application No. PCT/JP2014/077896, filed on Oct. 21, 2014.

(30) Foreign Application Priority Data

Dec. 27, 2013 (JP) ................. 2013-270770

(51) Int. Cl.
*H04B 1/44* (2006.01)
*H04B 1/18* (2006.01)
(Continued)

(52) U.S. Cl.
CPC ............... *H04B 1/16* (2013.01); *H04B 1/006* (2013.01); *H04L 5/14* (2013.01)

(58) Field of Classification Search
CPC ............ H01B 1/04; H01B 1/16; H01B 1/40; H01B 1/44; H01B 1/48; H01B 1/005; H01B 1/0053; H01B 1/006; H01B 1/0064; H01B 1/406; H01B 1/581; H04W 88/02; H04W 88/06
(Continued)

(56) References Cited

U.S. PATENT DOCUMENTS 7,541,888 B2 * 6/2009 Wu .................. H01P 1/203
333/204
8,391,927 B2 * 3/2013 Castaneda ............ H01Q 1/2266
455/277.1
(Continued)

FOREIGN PATENT DOCUMENTS

JP 2006-237978 A 9/2006

OTHER PUBLICATIONS

Official Communication issued in International Application PCT/JP2014/077896, mailed on Dec. 2, 2014.

*Primary Examiner* — Quochien B Vuong
(74) *Attorney, Agent, or Firm* — Keating & Bennett, LLP

(57) ABSTRACT

A front end circuit includes a switch including a common terminal and a plurality of individual terminals, in which at least two kinds of reception signals of different frequency bands are input to the common terminal, and in which one of the at least two kinds of reception signals is output to an individual terminal selected from the plurality of individual terminals, and in which a non-selected terminal is grounded, and a balun including a first terminal and a second terminal defining unbalanced ports as well as a third terminal and a fourth terminal defining balanced ports. The first individual terminal of the switch is indirectly connected to the first terminal of the balun and the second individual terminal of the switch is indirectly connected to the second terminal of the balun. The at least two kinds of reception signals are output in a balanced mode from the third terminal and the fourth terminal of the balun.

19 Claims, 4 Drawing Sheets

(51) Int. Cl.
*H04B 1/16* (2006.01)
*H04B 1/00* (2006.01)
*H04L 5/14* (2006.01)

(58) Field of Classification Search
USPC ...... 455/73, 78, 82, 83, 192.1, 552.1, 553.1; 370/278
See application file for complete search history.

(56) References Cited

U.S. PATENT DOCUMENTS

| | | | |
|---|---|---|---|
| 8,787,964 B2* | 7/2014 | Soman | H04B 1/18 455/78 |
| 2010/0302976 A1* | 12/2010 | Tikka | H04B 1/04 370/278 |

* cited by examiner

FRONT END CIRCUIT

BACKGROUND OF THE INVENTION

1. Field of the Invention

The present invention relates to a front end circuit that is provided in a multiband communication device that communicates while handling a plurality of frequency bands, and is located between a communication circuit and an antenna therein.

2. Description of the Related Art

In a front end circuit handling transmission/reception signals of a plurality frequency bands, such a circuit converts a reception signal to a balanced signal and outputs the obtained balanced signal to a reception circuit, as disclosed in Japanese Unexamined Patent Application Publication No. 2006-237978, for example.

FIG. 4 is a circuit diagram of a multiband communication device disclosed in Japanese Unexamined Patent Application Publication No. 2006-237978. This example includes two antennas ANT1 and ANT2, a DPDT switch, a reception side circuit, and a transmission side circuit. The reception side circuit includes a reception side duplexer and two baluns 12 and 2.

By converting a reception signal to a balanced signal and outputting the obtained balanced signal to a low noise amplifier (LNA), a radio frequency integrated circuit (RFIC), or the like in the manner described above, noise immunity of the reception signal is improved.

In the multiband communication device as shown in FIG. 4, reception signals of different frequency bands, after having passed a reception side duplexer, experience balance-conversion performed by different baluns. In this manner, conventional multiband communication devices generally include baluns corresponding to the frequency bands. Accordingly, as the frequency bands increase in number, the number of baluns increases, which arrests miniaturization of the overall circuit.

SUMMARY OF THE INVENTION

Preferred embodiments of the present invention provide a front end circuit that is used in a multiband communication device and is capable of being miniaturized while including a circuit that converts a reception signal to a balanced signal.

A front end circuit according to a preferred embodiment of the present invention includes a switch that includes a common terminal and a plurality of individual terminals including a first individual terminal and a second individual terminal, wherein at least two kinds of reception signals of different frequency bands, which do not sandwich a transmission frequency band and in which at least a portion of reception frequency bands are close to or overlap with each other, are input to the common terminal, one of the at least two kinds of reception signals is output to an individual terminal selected from the first and second individual terminals, a non-selected terminal is grounded, the front end circuit further including a balun including a first terminal and a second terminal defining unbalanced ports and a third terminal and a fourth terminal defining balanced ports, wherein the first individual terminal of the switch is directly or indirectly connected to the first terminal of the balun, the second individual terminal of the switch is directly or indirectly connected to the second terminal of the balun, and the at least two kinds of reception signals are output in a balanced mode from the third terminal and the fourth terminal of the balun.

With the above-discussed structure, although a function to output reception signals of at least two frequency bands in the form of a balanced signal is provided, it is unnecessary to provide baluns corresponding to the respective frequency band, thus making it possible to miniaturize the front end circuit.

It is preferable that filters that pass the at least two types of reception signals are provided between the first individual terminal of the switch and the first terminal of the balun and between the second individual terminal of the switch and the second terminal of the balun. With this structure, the transmission line of the reception signals is provided in a balanced line without increasing the number of signal lines.

It is preferable for the balun to have a bandpass characteristic that allows the at least two kinds of reception signals to pass. This results in the balun defining and functioning as a filter that passes the reception signals, thus making it possible to reduce the number of filters.

Further, a front end circuit according to another preferred embodiment of the present invention includes a first switch and a second switch each including a common terminal and a plurality of individual terminals, and a balun including a first terminal and a second terminal defining unbalanced ports and a third terminal and a fourth terminal defining balanced ports, wherein two kinds of reception signals of different frequency bands which do not sandwich a transmission frequency band and in which at least a portion of frequency bands are close to or overlap with each other are input to the common terminal of the first switch and the common terminal of the second switch, and one individual terminal of the first switch is directly or indirectly connected to the first terminal of the balun, one individual terminal of the second switch is directly or indirectly connected to the second terminal of the balun, and the two kinds of reception signals are output in a balanced mode from the third terminal and the fourth terminal of the balun.

With the above-discussed structure, also in a circuit configuration where a plurality of antennas are connected, two kinds of reception signals are converted to balanced signals and output.

According to various preferred embodiments of the present invention, a front end circuit is small in size and has a function to output reception signals of at least two frequency bands in the form of a balanced signal.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
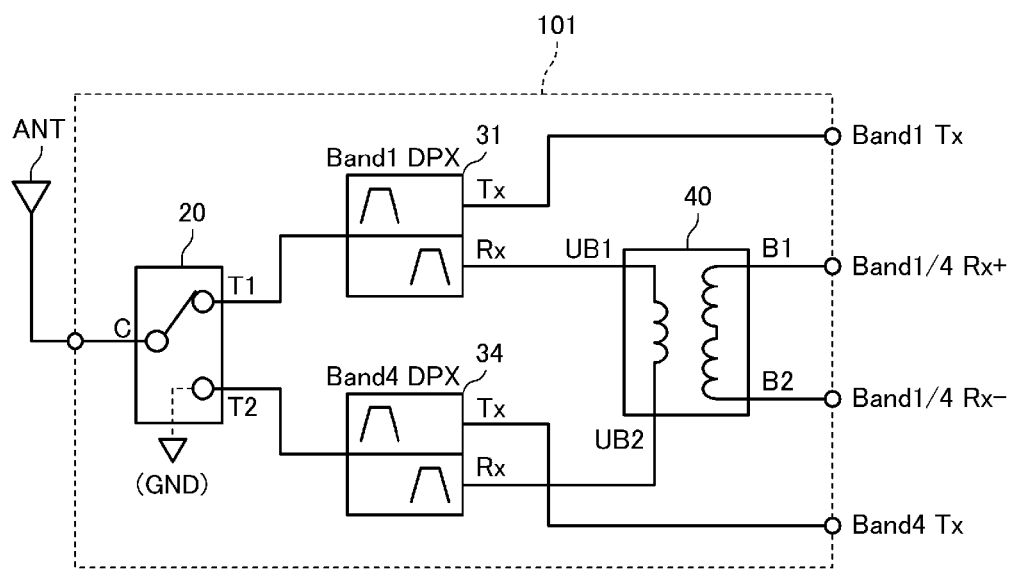
FIGS. 1A and 1B are circuit diagrams of a front end circuit 101 according to a first preferred embodiment of the present invention.

Several preferred embodiments of the present invention will be described hereinafter with reference to the drawings, using several specific examples. In the drawings, identical constituent elements are assigned the same reference numerals. The preferred embodiments are merely examples, and that configurations described in different preferred embodiments can partially replace each other or be combined as well.

First Preferred Embodiment

Figure 1B:
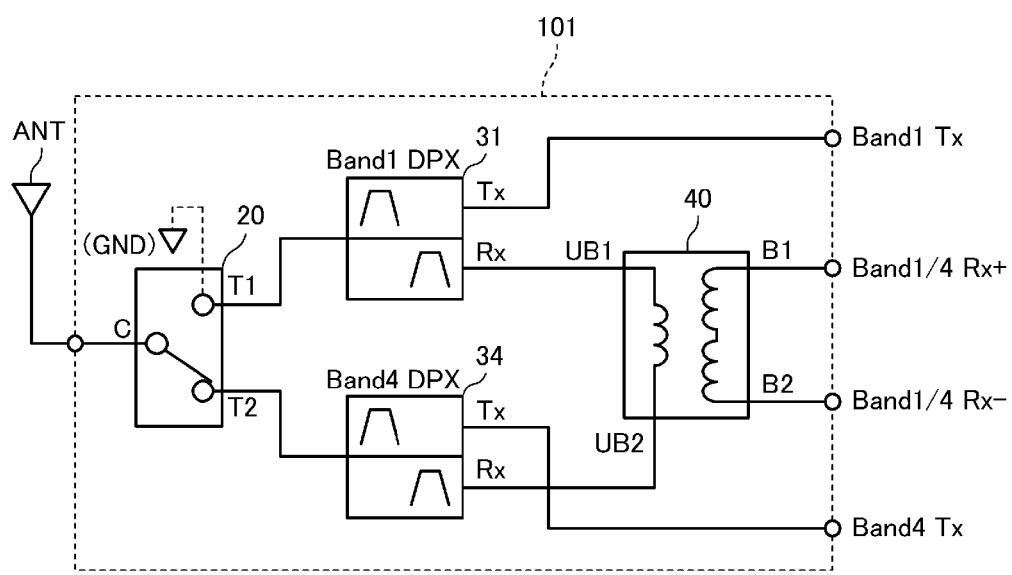

FIGS. 1A and 1B are circuit diagrams of a front end circuit 101 according to a first preferred embodiment of the present invention. The front end circuit 101 is provided in a communication device using the frequency bands 1 and 4 of LTE (Long Term Evolution). The front end circuit 101 includes an antenna terminal to which an antenna ANT is connected. The front end circuit 101 further includes a terminal Band1 Tx to which a transmission signal of the frequency band 1 is input in an unbalanced mode and a terminal Band4 Tx to which a transmission signal of the frequency band 4 is input in an unbalanced mode. Moreover, the front end circuit 101 includes terminals Band1/4 Rx+ and Band1/4 Rx− from which reception signals of the frequency band 1 and the frequency band 4 are output in a balanced mode.

The reception signal band of the frequency band 1 preferably is in a range from 2110 MHz to 2170 MHz while the transmission signal band thereof preferably is in a range from 1920 MHz to 1980 MHz, and the reception signal band of the frequency band 4 preferably is in a range from 2110 MHz to 2155 MHz while the transmission signal band thereof preferably is in a range from 1710 MHz to 1755 MHz, for example. In other words, the reception signal frequency bands of the frequency band 1 and the frequency band 4 are related on the frequency axis so as to partially overlap with each other and not to sandwich the transmission signal frequency band of the frequency band 1 and the transmission signal frequency band of the frequency band 4.

The front end circuit 101 includes a switch 20, duplexers 31 and 34, and a balun 40. The switch 20 includes a common terminal C, a first individual terminal T1, and a second individual terminal T2; inputs two kinds of reception signals of different frequency bands to the common terminal; and outputs the reception signals to a selected individual terminal selected from the first and second individual terminals. The switch 20 is a short-type SPDT (single pole, dual throw) high frequency switch in which a non-selected terminal is grounded in a high frequency manner. Here, the "non-selected terminal is grounded in a high frequency manner" means that impedance at the non-selected terminal of the high frequency switch has impedance close to a grounded state with respect to the reception frequency band.

The duplexer 31 is a duplexer to separate a transmission signal and a reception signal of the frequency band 1, and includes a transmission filter that outputs the transmission signal of the frequency band 1 from the Tx terminal to a port on the antenna side and a reception filter that outputs the reception signal of the frequency band 1 from the port on the antenna side to the Rx terminal. The reception filter of the duplexer 31 has a bandpass characteristic that allows not only the reception signal band of the frequency band 1 to pass, but also allows the reception signal band of the frequency band 4 to pass. Meanwhile, the duplexer 34 is a duplexer to separate a transmission signal and a reception signal of the frequency band 4, and includes a transmission filter that outputs the transmission signal of the frequency band 4 from the Tx terminal to a port on the antenna side and a reception filter that outputs the reception signal of the frequency band 4 from the port on the antenna side to the Rx terminal. The reception filter of the duplexer 34 has a bandpass characteristic that allows not only the reception signal band of the frequency band 4 to pass, but also allows the reception signal band of the frequency band 1 to pass.

The balun 40 includes a first terminal UB1 and a second terminal UB2 as unbalanced ports, and a third terminal B1 and a fourth terminal B2 as balanced ports.

FIG. 1A illustrates a state where the switch 20 has selected the duplexer 31 side, and the FIG. 1B illustrates a state where the switch 20 has selected the duplexer 34 side. In the state shown in FIG. 1A, a transmission signal of the frequency band 1 is transmitted while travelling a path from the terminal Band1 Tx to the antenna ANT through the transmission filter of the duplexer 31 and the switch 20. A reception signal of the frequency band 1 from the antenna ANT flows in a path including the switch 20, the reception filter of the duplexer 31, the first terminal UB1 of the balun 40, the second terminal UB2 of the balun 40, the reception filter of the duplexer 34, and a non-selected terminal (GND) of the switch 20 in that order. Then, an output signal from the third terminal B1 and the fourth terminal B2 of the balun 40 is output to the terminals Band1/4 Rx+ and Band1/4 Rx−. Accordingly, the reception signal of the frequency band 1 is output in the form of a balanced signal.

Meanwhile, in the state shown in FIG. 1B, a transmission signal of the frequency band 4 is transmitted while travelling a path from the terminal Band4 Tx to the antenna ANT through the transmission filter of the duplexer 34 and the switch 20. A reception signal of the frequency band 4 from the antenna ANT flows in a path including the switch 20, the reception filter of the duplexer 34, the second terminal UB2 of the balun 40, the first terminal UB1 of the balun 40, the reception filter of the duplexer 31, and a non-selected terminal (GND) of the switch 20 in that order. Then, an output signal from the third terminal B1 and the fourth terminal B2 of the balun 40 is output to the terminals Band1/4 Rx+ and Band1/4 Rx−. Accordingly, the reception signal of the frequency band 4 is also output in the form of a balanced signal.

Because the reception signal frequency bands of the frequency band 1 and the frequency band 4 are related so as not to sandwich the transmission signal frequency band of the frequency band 1 and the transmission signal frequency band of the frequency band 4 therebetween, a pass band of the reception filter of the duplexer 31 and a pass band of the reception filter of the duplexer 34 do not include the transmission signal bands of the frequency band 1 and the frequency band 4. Therefore, the reception filter of the duplexer 31 will not pass the transmission signals of the frequency band 1 and the frequency band 4, and the reception filter of the duplexer 34 will not pass the transmission signals of the frequency band 1 and the frequency band 4.

As discussed above, the reception signals of the frequency band 1 and the frequency band 4 are output in the balanced mode while using a single balun.

Second Preferred Embodiment

Figure 2:
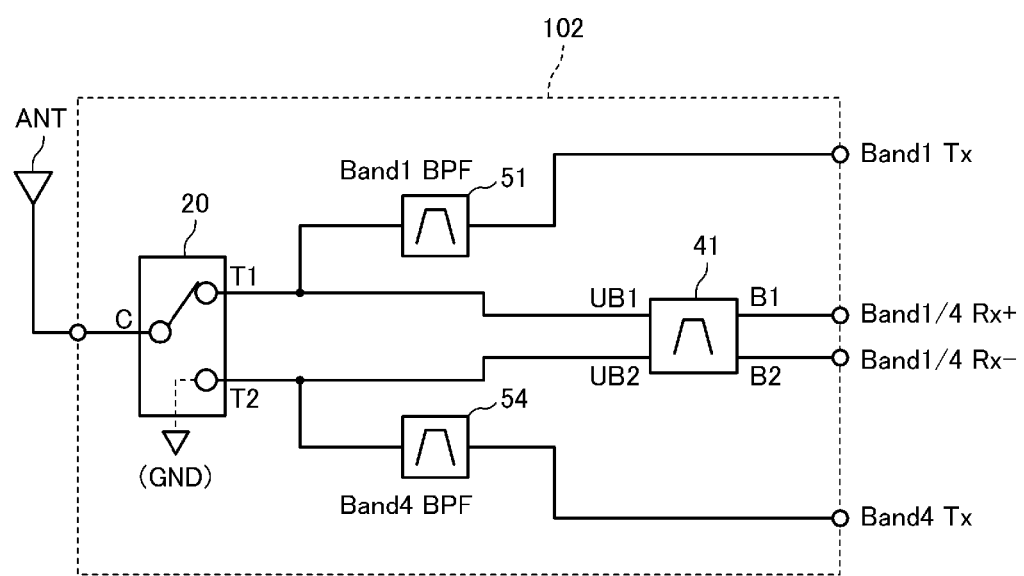
FIG. 2 is a circuit diagram of a front end circuit 102 according to a second preferred embodiment of the present invention.

FIG. 2 is a circuit diagram of a front end circuit 102 according to a second preferred embodiment of the present invention. The front end circuit 102 is also provided in a communication device using the frequency bands 1 and 4 of LTE like the case of the first preferred embodiment. The front end circuit 102 includes an antenna terminal to which the antenna ANT is connected, the terminal Band1 Tx to which a transmission signal of the frequency band 1 is input in an unbalanced mode, and the terminal Band4 Tx to which a transmission signal of the frequency band 4 is input in an unbalanced mode. Further, the front end circuit 102 includes the terminals Band1/4 Rx+ and Band1/4 Rx− from which reception signals of the frequency band 1 and the frequency band 4 are output in a balanced mode.

The front end circuit 102 includes the switch 20, a transmission filter 51 for the frequency band 1, a transmission filter 54 for the frequency band 4, and a balun 41 having a bandpass characteristic. The transmission filter 51 is a band pass filter that passes a transmission signal of the frequency band 1 input from the Band1 Tx terminal, and the transmission filter 54 is also a band pass filter that passes a transmission signal of the frequency band 4 input from the Band4 Tx terminal.

Like an example described in FIG. 1, the switch 20 has the common terminal C and the first and second individual terminals, inputs two kinds of reception signals of different frequency bands to the common terminal C, and outputs the reception signals to a selected individual terminal selected from the first individual terminal T1 and the second individual terminal T2. Note that the switch 20 grounds a non-selected terminal in a high frequency manner.

The balun 41 includes the first terminal UB1 and the second terminal UB2 defining unbalanced ports, and the third terminal B1 and the fourth terminal B2 defining balanced ports. The balun 41 has a bandpass characteristic that allows reception signals of the frequency band 1 and the frequency band 4 to pass, but blocks other frequency bands. In other words, the balun 41 defines and functions as both a balance-unbalance converter and a reception filter. Because the reception signal frequency bands of the frequency band 1 and the frequency band 4 are related so as not to sandwich the transmission signal frequency band of the frequency band 1 and the transmission signal frequency band of the frequency band 4 therebetween, the pass band of the balun 41 do not include the transmission signal bands of the frequency band 1 and the frequency band 4. Therefore, the balun 41 will not pass the transmission signals of the frequency band 1 and the frequency band 4.

FIG. 2 illustrates a state where the switch 20 has selected the terminal T1 side. In the state shown in FIG. 2, a transmission signal of the frequency band 1 is transmitted while travelling a path from the terminal Band1 Tx to the antenna ANT through the transmission filter 51 and the terminal T1 of the switch 20. A reception signal of the frequency band 1 from the antenna ANT flows in a path from the switch 20 to the terminal T2 (GND) of the switch 20 through the first terminal UB1 and second terminal UB2 of the balun 41. Then, an output signal from the third terminal B1 and fourth terminal B2 of the balun 41 is output to the terminals Band1/4 Rx+ and Band1/4 Rx−. Accordingly, the reception signal of the frequency band 1 is output in the form of a balanced signal.

In the case where the switch 20 selects the terminal T2 side in FIG. 2, a transmission signal of the frequency band 4 is transmitted while travelling a path from the terminal Band4 Tx to the antenna ANT through the transmission filter 54 and the terminal T2 of the switch 20. A reception signal of the frequency band 4 from the antenna ANT flows in a path from the switch 20 to the terminal T1 (GND) of the switch 20 through the second terminal UB2 and first terminal UB1 of the balun 41. Then, an output signal from the third terminal B1 and fourth terminal B2 of the balun 41 is output to the terminals Band1/4 Rx+ and Band1/4 Rx−. Accordingly, the reception signal of the frequency band 4 is also output in the form of a balanced signal.

As discussed above, the reception signals of the frequency band 1 and frequency band 4 are output in the balanced mode while using a single balun.

According to the present preferred embodiment, since the balun defines and functions as a filter that passes the reception signals, the number of filters is able to be reduced.

Third Preferred Embodiment

Figure 3:
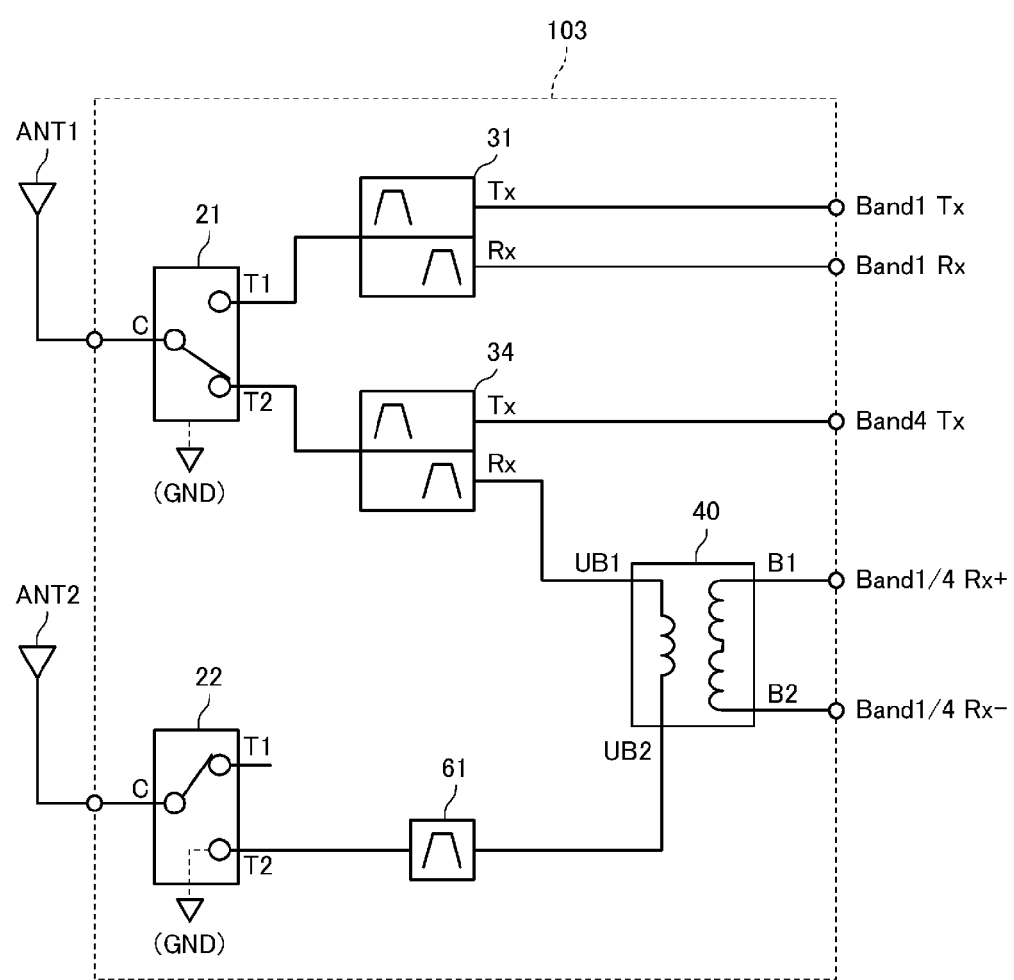
FIG. 3 is a circuit diagram of a front end circuit 103 according to a third preferred embodiment of the present invention.
Figure 4:
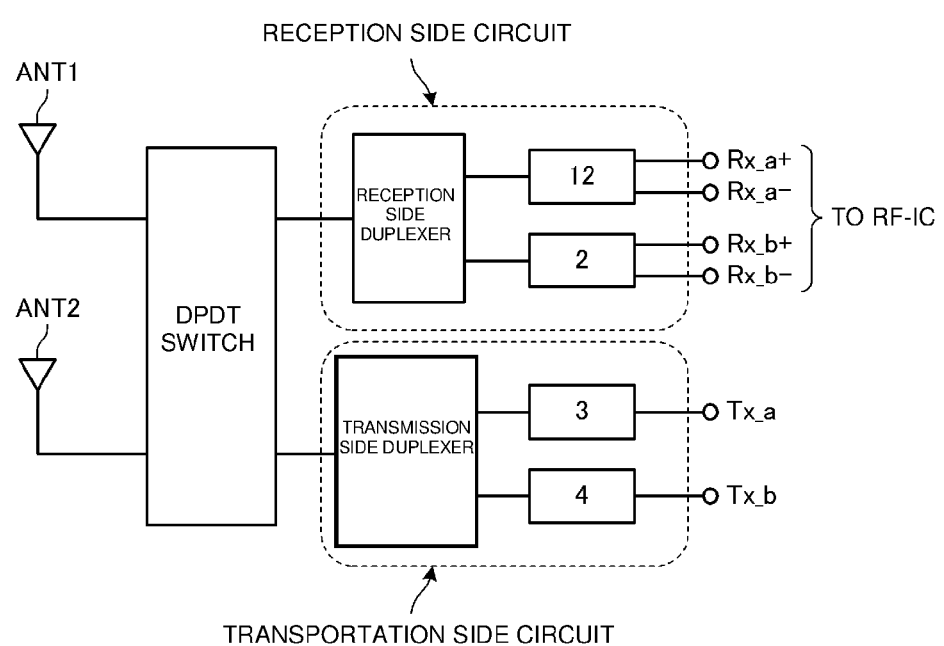
FIG. 4 is a circuit diagram of a multiband communication device disclosed in Japanese Unexamined Patent Application Publication No. 2006-237978.

FIG. 3 is a circuit diagram of a front end circuit 103 according to a third preferred embodiment of the present invention. Two antennas ANT1 and ANT2 are connected to the front end circuit 103. The antenna ANT1 is preferably used to transmit/receive the frequency band 1 and frequency band 4 of LTE, while the antenna ANT2 is an antenna for antenna diversity and is used to receive the LTE frequency band 1.

The front end circuit 103 includes the terminal Band1 Tx to which a transmission signal of the frequency band 1 is input in an unbalanced mode, an output terminal Band1 Rx from which a reception signal of the frequency band 1 is output in an unbalanced mode, the terminal Band4 Tx to which a transmission signal of the frequency band 4 is input in an unbalanced mode, and the terminals Band1/4 Rx+ and Band1/4 Rx− from which reception signals of the frequency band 1 and the frequency band 4 are output in a balanced mode.

The front end circuit 103 further includes the switch 21, a switch 22, the duplexer 31 for the frequency band 1, the duplexer 34 for the frequency band 4, a reception filter 61 for the frequency bands 1 and 4, and the balun 40.

The duplexer 31 is a duplexer to separate a transmission signal and a reception signal of the frequency band 1, and outputs the transmission signal of the frequency band 1 from the Tx terminal to a port on the antenna side and also outputs the reception signal of the frequency band 1 from the port on the antenna side to the Rx terminal. The duplexer 34 is a duplexer to separate a transmission signal and a reception signal of the frequency band 4, and outputs the transmission signal of the frequency band 4 from the Tx terminal to a port on the antenna side and also outputs the reception signal of the frequency band 4 from the port on the antenna side to the Rx terminal. The reception filter of the duplexer 34 has a bandpass characteristic that allows not only the reception signal band of the frequency band 4 to pass, but also allows the reception signal band of the frequency band 1 to pass. The reception filter 61 passes the reception signal of the frequency band 1 from the antenna ANT2. The reception filter 61 has a bandpass characteristic that allows not only the reception signal band of the frequency band 1 to pass, but also allows the reception signal band of the frequency band 4 to pass.

The balun 40 includes the first terminal UB1 and second terminal UB2 defining unbalanced ports, and the third terminal B1 and fourth terminal B2 defining balanced ports.

In an example shown in FIG. 3, the switch 21 has selected the duplexer 34 side and the switch 22 has set the reception filter side to a non-selected state. In this circuit state, a transmission signal of the frequency band 4 is transmitted while travelling a path from the terminal Band4 Tx to the antenna ANT1 through the transmission filter of the duplexer 34 and the switch 21. A reception signal of the frequency band 4 from the antenna ANT1 flows in a path including the switch 21, the reception filter of the duplexer 34, the first terminal UB1 of the balun 40, the second terminal UB2 of the balun 40, the reception filter 61, and a non-selected terminal (GND) of the switch 22 in that order.

Then, an output signal from the third terminal B1 and fourth terminal B2 of the balun 40 is output to the terminals Band1/4 Rx+ and Band1/4 Rx−. As such, the reception signal of the frequency band 4 is output in the form of a balanced signal.

In the case where the state shown in FIG. 3 is reversed, in other words, in the case where the switch 21 selects the duplexer 31 side and the switch 22 sets the reception filter 61 side to a selected state, the transmission signal of the frequency band 1 is transmitted along a path from the terminal Band1 Tx to the antenna ANT1 through the transmission filter of the duplexer 31 and the switch 21. The reception signal of the frequency band 1 from the antenna ANT1 flows along a path from the switch 21 to the output terminal Band1 Rx through the reception filter of the duplexer 31. A reception signal current of the frequency band 1 from the antenna ANT2 flows along a path including the switch 22, the reception filter 61, the second terminal UB2 of the balun 40, the first terminal UB1 of the balun 40, the reception filter of the duplexer 34, and a non-selected terminal (GND) of the switch 21 in that order. Then, an output signal from the third terminal B1 and fourth terminal B2 of the balun 40 is output to the terminals Band1/4 Rx+ and Band1/4 Rx−. As such, the reception signal of the frequency band 1 is also output in the form of a balanced signal.

Because the reception signal frequency bands of the frequency band 1 and the frequency band 4 are related so as not to sandwich the transmission signal frequency band of the frequency band 1 and the transmission signal frequency band of the frequency band 4 therebetween, the pass band of the reception filter of the duplexer 34 and the pass band of the reception filter 61 do not include the transmission signal bands of the frequency band 1 and the frequency band 4. Therefore, the reception filter of the duplexer 34 will not pass the transmission signals of the frequency band 1 and the frequency band 4.

In the example shown in FIG. 3, the duplexer 31 that separates the transmission signal and reception signal of the frequency band 1 is provided, and the antenna ANT1 is used to transmit/receive the frequency band 1 and the frequency band 4. However, the duplexer 31 is not directly related to the circuit configuration to output the reception signals of the frequency band 1 and the frequency band 4 in the balanced mode. Accordingly, a circuit other than the duplexer 31 may be connected to the terminal T1 of the switch 21. Moreover, a circuit connected to the terminal T1 of the switch 22 is not directly related to the circuit configuration to output the reception signals of the frequency band 1 and the frequency band 4 in the balanced mode.

Thus, the present preferred embodiment preferably is applied to a circuit in which a plurality of antennas are connected, thus making it possible to convert two kinds of reception signals to the balanced signals.

Other Preferred Embodiments

Although examples in which a current of an unbalanced reception signal to experience the unbalance-balance conversion flows through the SPDT switch are described in the above preferred embodiments, the switch is able to be applied in the same manner even if it has three or more individual terminals.

Further, in the preferred embodiments discussed above, examples in which a reception signal is output in a balanced mode with the combination of the LTE frequency band 1 and the LTE frequency band 4 are described. Note that, however, in other combinations of LTE frequency bands, such as the frequency band 1 and frequency band 10, the frequency band 20 and frequency band 28, the frequency band 1 and frequency band 23, and so on, the reception signal frequency bands of the respective two frequency bands in combination are related so as not to sandwich the transmission signal frequency bands of the two frequency bands. Because of this, the other combinations as mentioned above are able to be applied in the same manner.

Furthermore, in the preferred embodiments discussed above, there are cited examples in which two kinds of reception signals whose frequency bands partially overlap with each other are handled. However, such a relationship is also able to be applied in the same manner such that at least portions of the frequency bands are close to each other.

In the preferred embodiments discussed thus far, examples in which two kinds of reception signals of different frequency bands are input to the common terminal of a switch are cited. However, preferred embodiments of the present invention are also able to be applied to a case in which no less than three kinds of reception signals are handled. For example, preferred embodiments of the present invention are also able to be applied to a configuration in which reception signals of a plurality of frequency bands are output from selected individual terminals of a switch.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A front end circuit comprising:
   a switch that includes a common terminal and a plurality of individual terminals including a first individual terminal and a second individual terminal, inputs to the common terminal at least two kinds of reception signals of different frequency bands which do not sandwich a transmission frequency band and in which at least a portion of reception frequency bands are close to or overlap with each other, outputs one of the at least two kinds of reception signals to an individual terminal selected from the first and second individual terminals, and grounds a non-selected terminal; and
   a balun including a first terminal and a second terminal defining unbalanced ports and a third terminal and a fourth terminal defining balanced ports; wherein
   the first individual terminal of the switch is directly or indirectly connected to the first terminal of the balun, the second individual terminal of the switch is directly or indirectly connected to the second terminal of the balun, and the at least two kinds of reception signals are output in a balanced mode from the third terminal and the fourth terminal of the balun.

2. The front end circuit according to claim 1, further comprising:
   filters that pass the at least two types of reception signals interposed between the first individual terminal of the switch and the first terminal of the balun and between the second individual terminal of the switch and the second terminal of the balun.

3. The front end circuit according to claim 1, wherein the balun has a bandpass characteristic that allows the at least two kinds of reception signals to pass.

4. The front end circuit according to claim 1, wherein the transmission frequency band and the reception frequency bands are frequency bands of Long Term Evolution.

5. The front end circuit according to claim 1, wherein one of the reception frequency bands is in a range from 2110 MHz to 2170 MHz, another of the reception frequency bands is in a range from 2110 MHz to 2155 MHz, and the transmission frequency band is in a range from 1920 MHz to 1980 MHz or 1710 MHz to 1755 MHz.

6. The front end circuit according to claim 1, wherein the switch is a short-type single pole, dual throw high frequency switch.

7. The front end circuit according to claim 1, further comprising duplexers that separate a transmission signal from the reception signals.

8. The front end circuit according to claim 1, further comprising duplexers each including a transmission filter and a reception filter.

9. The front end circuit according to claim 8, wherein a pass band of the reception filter of one of the duplexers and a pass band of the reception filter of another one of the duplexers do not include a transmission frequency band of the different frequency bands.

10. The front end circuit according to claim 1, wherein the balun defines and functions as both a balance-unbalance converter and a reception filter.

11. A communication device comprising the front end circuit according to claim 1.

12. A front end circuit comprising:
a first switch and a second switch each including a common terminal and a plurality of individual terminals, and a balun including a first terminal and a second terminal defining unbalanced ports and a third terminal and a fourth terminal defining balanced ports; wherein
two kinds of reception signals of different frequency bands which do not sandwich a transmission frequency band and in which at least a portion of reception frequency bands are close to or overlap with each other are input to the common terminal of the first switch and the common terminal of the second switch; and
one of the plurality of individual terminals of the first switch is directly or indirectly connected to the first terminal of the balun, one of the plurality of individual terminals of the second switch is directly or indirectly connected to the second terminal of the balun, and the two kinds of reception signals are output in a balanced mode from the third terminal and the fourth terminal of the balun.

13. The front end circuit according to claim 12, further comprising a first duplexer for a first of the different frequency bands, a second duplexer for a second of the different frequency bands, and a reception filter for each of the first and second frequency bands.

14. The front end circuit according to claim 13, wherein a pass band of a reception filter of the first duplexer and a pass band of a reception filter of the second duplexer do not include a transmission frequency band of the different frequency bands.

15. The front end circuit according to claim 12, wherein the front end circuit is connected to a plurality of antennas.

16. The front end circuit according to claim 12, further comprising:
filters that pass the at least two types of reception signals interposed between the first individual terminal of the switch and the first terminal of the balun and between the second individual terminal of the switch and the second terminal of the balun.

17. The front end circuit according to claim 12, wherein the balun has a bandpass characteristic that allows the at least two kinds of reception signals to pass.

18. The front end circuit according to claim 12, wherein the transmission frequency band and the reception frequency bands are frequency bands of Long Term Evolution.

19. A communication device comprising the front end circuit according to claim 12.

* * * * *